United States Patent
Nakayama et al.

[11] Patent Number: 6,136,741
[45] Date of Patent: Oct. 24, 2000

[54] SEMICONDUCTING CERAMIC, SEMICONDUCTING CERAMIC ELEMENT, AND METHOD FOR PRODUCING THE SEMICONDUCTING CERAMIC

[75] Inventors: Akinori Nakayama, Otsu; Satoshi Ueno, Shiga-ken, both of Japan

[73] Assignee: Murata Manufacturing Co., Ltd., Japan

[21] Appl. No.: 09/515,831

[22] Filed: Feb. 29, 2000

[30] Foreign Application Priority Data

Mar. 4, 1999 [JP] Japan ................................ 11-056911

[51] Int. Cl.$^7$ ........................... H01B 1/08; C04B 35/50; H01C 7/10; H03B 5/12
[52] U.S. Cl. .................. 501/152; 252/521.1; 252/521.2; 338/22 SD; 331/158
[58] Field of Search .................. 252/521.1, 521.2; 501/126, 152; 338/22 SD; 331/158

[56] References Cited

U.S. PATENT DOCUMENTS 6,054,403  4/2000  Kawase et al. ...................... 501/152

OTHER PUBLICATIONS

Sanaris–Rodriguez et al "Effect of pargici size on the magnetic . . ." Bol. Soc. Esp. Ceram Vidrio (1998) 37(1) 25–30 (Abstract only).

"Mossbauer Studies of the High–Spin–Low–Spin Equilibria and the Localized–Collective Electron Transition in $LaCoO_3$"; V.G. Bhide, et al.; Physical Review B; vol. 6, No. 3; Aug. 1, 1972; pp. 1021–1032.

*Primary Examiner*—Mark Kopec
*Attorney, Agent, or Firm*—Ostrolenk, Faber, Gerb & Soffen, LLP

[57] ABSTRACT

A semiconducting ceramic contains a lanthanum cobalt oxide as a major component represented by $La_xCoO_3$ wherein $0.600 \leq x \leq 0.999$. The average crystal grain size of cobalt oxide present in the major component is not more than about 20 $\mu$m. A change in resistivity between the semiconducting ceramic products can be suppressed.

21 Claims, 1 Drawing Sheet

SEMICONDUCTING CERAMIC, SEMICONDUCTING CERAMIC ELEMENT, AND METHOD FOR PRODUCING THE SEMICONDUCTING CERAMIC

BACKGROUND OF THE INVENTION

1. Field of the Invention

The present invention relates to semiconducting ceramic, particularly to a semiconducting ceramic having a negative resistance-temperature coefficient, to a semiconducting ceramic element using the semiconducting ceramic, and to a method for producing the semiconducting ceramic.

2. Description of the Related Art

Semiconducting ceramic elements (hereinafter referred to as NTC elements) having high resistance at ordinarily temperature and having negative temperature coefficients of resistance (hereinafter referred to as NTC characteristics) so that the resistance decreases as the temperature increases are known. The NTC elements are used for suppressing the rush current, for delaying motor start and for protecting halogen lamps, in consideration of the above characteristics.

An NTC element for suppressing the rush current absorbs an initial rush current and suppresses an overcurrent in a circuit when a switching electrical power source is turned on. The NTC element is subjected to self-heating so as to decrease the resistance thereof. Thus, electrical power consumption is reduced at the stationary state.

An NTC element for delaying motor start applies a decreased voltage to motor terminals in an initial state to suppress the rotation of a motor mounted in a gear unit in which lubricant oil is supplied after the motor starts. The NTC element is self-heated so as to decrease the resistance thereof. Thus, the rotation of the motor gradually increases and reaches a stationary state.

Semiconducting ceramic having NTC characteristics for NTC elements contain spinel-type compound oxides comprising transition metal elements, such as Mn, Co, Ni, and Cu. For example, V. G. Bhide and D. S. Rajoria (Phys. Rev. B6, [3], p. 1072 (1972)) disclose a lanthanum cobalt oxide having NTC characteristics in which the B constant shows temperature dependence and increases at higher temperature. Japanese Unexamined Patent Application Publication No. 7-176406 discloses a compound oxide comprising $La_x CoO_3$ as the major component, wherein $0.600 \leq x \leq 0.999$ and an oxide of Si, Zr, Hf, Sn, W, Mo or Cr. The compound oxide has a resistivity of 20 Ω or less at ordinary temperature and a B constant of 3,200 K or more.

It is known that semiconducting ceramics comprising lanthanum cobalt oxides represented by $La_x CoO_3$ are spontaneously degraded when lanthanum is present in excess of cobalt (x>1). Excess lanthanum is precipitated in the grain boundaries of the ceramic and is modified from oxide to hydroxide by moisture absorption. As a result, the excess lanthanum swells and causes degradation of the semiconducting ceramic. Thus, the semiconducting ceramic comprising $La_x CoO_3$ as the major component are prepared so that Co is present in excess of La (x<1).

In the semiconducting ceramic containing excess cobalt with respect to lanthanum, cobalt oxides, such as CoO and $Co_3 O_4$, are also present in addition to lanthanum cobalt oxide $LaCoO_3$. $LaCoO_3$ has a low resistivity of 20 Ω at ordinary temperature, whereas Co and $Co_3 O_4$ have a high resistivity of 1 M Ω or more. When such a low-resistivity material and a high-resistivity material are simultaneously present in the semiconducting ceramic, it is difficult to control the production steps for achieving the same resistivity for individual products, compared to spinel-type compound oxides comprising transition metal elements.

SUMMARY OF THE INVENTION

It is an object of the present invention to provide a semiconducting ceramic which has stable resistivity by using a lanthanum cobalt oxide having excellent dependence of resistivity on temperature.

It is another object of the present invention to provide a semiconducting ceramic element using the semiconducting ceramic.

It is still another object of the present invention to provide a method for producing a semiconducting ceramic.

According to a first aspect of the present invention, a semiconducting ceramic comprises a lanthanum cobalt oxide, as a major component, represented by $La_x CoO_3$ wherein $0.600 \leq x \leq 0.999$, wherein the average crystal grain size of cobalt oxide present in the major component is not more than about 20 μm.

This semiconducting ceramic contains a lanthanum cobalt oxide as the major component and shows a small change in resistivity.

According to a second aspect of the present invention, a semiconducting ceramic element comprises the semiconducting ceramic according to the first embodiment, wherein electrodes are formed on both main surfaces of the semiconducting ceramic.

The semiconducting ceramic has a B constant of 4,000 K or more at a high temperature of approximately 140° C. and has reduced resistance, resulting in reduced electrical power consumption. Since the semiconducting ceramic has a lower B constant at a low temperature of, for example, −10° C., the resistance of the semiconducting ceramic in adequately increased so as to avoid an overcurrent flow in an apparatus and to prevent undesirable delay of start-up of the apparatus.

Preferably, the semiconducting ceramic element is used for suppressing a rush current, for delaying motor start, for protecting a halogen lamp or in a temperature-compensation-type quart oscillator.

According to a third aspect of the present invention, a method for producing a semiconducting ceramic comprises a weighing step for weighing a powdered lanthanum compound and a powdered cobalt compound so that $La_x CoO_3$ is formed after sintering these powdered compounds, wherein $0.600 \leq x \leq 0.999$, a mixing step for mixing these powdered compounds so that the average grain size of cobalt oxide in a sintered compact is not more than about 20 μm after sintering these powdered compounds, a calcination step for calcining the mixture, a pulverizing step for pulverizing the calcined mixture and for forming a green compact, and a sintering step for sintering the green compact.

DESCRIPTION OF THE PREFERRED EMBODIMENT

Figure 1:
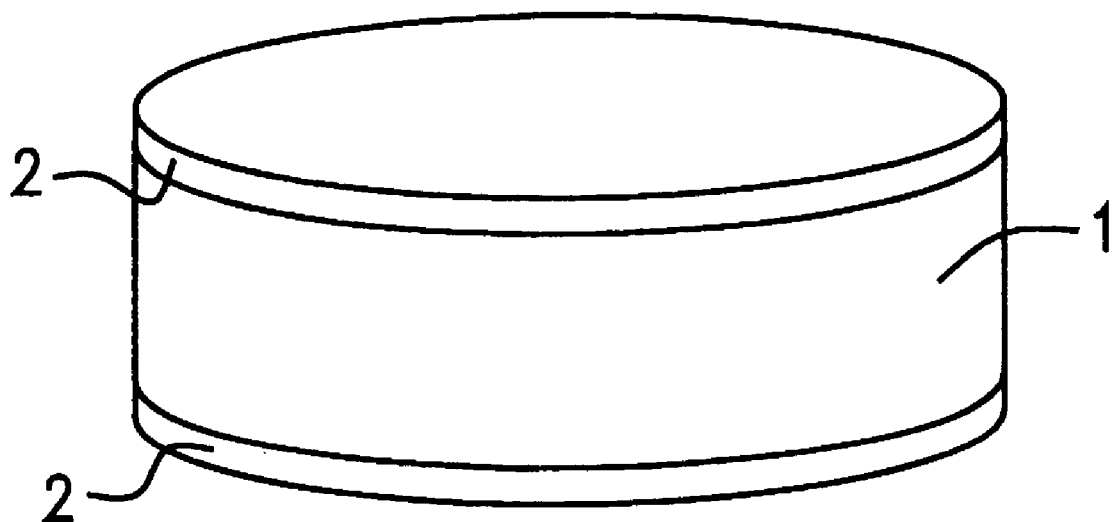
FIG. 1 is an isometric view of a semiconducting ceramic element in accordance with the present invention.

The semiconducting ceramic oil the present invention comprises a lanthanum cobalt oxide as a major component wherein the average crystal grain size of cobalt oxide present in the major component is not more than about 20 μm. The semiconducting ceramic may further comprise at least one oxide, as an auxiliary component, selected from the group consisting of oxides of Si, Zr, Hf, Ta, Sn, Sb, Cr, W, Mo, Te, Ce, Ni and Ca.

The auxiliary component is considered to be dissolved in not only $LaCoO_3$ but also in cobalt oxide crystals to some extent. Thus, strictly speaking, the cobalt oxide crystal should be referred to as a crystal containing cobalt oxide as the major component. The "cobalt oxide crystal" has such a meaning in the present invention.

It is preferable that cobalt be present in excess of lanthanum in the lanthanum cobalt oxide in order to avoid degradation of the ceramic composition due to swelling of lanthanum oxide. Such a state is represented by the formula $La_xCoO_3$ wherein the preferable lanthanum content x lies in a range of $0.600 \leq x \leq 0.999$. At a lantianum content x exceeding 0.600, sufficiently low resistivity and a sufficiently large B constant of the semiconducting ceramic composition are achieved. In addition, a lanthanum content x of less than 0.999 can effectively prevent degradation of the semiconducting ceramic composition due to swelling by the reaction of free lanthanum oxide ($La_2O_3$) in the semiconducting ceramic composition with atmospheric moisture. At least one element selected from the group consisting of Ce, Pr, Nd, Pm, Sm, Eu, Gd, Tb, Dy, Ho, Er, Tm, Yb, Lu, Bi, Sr and Y can be substituted for a part of La.

The cobalt oxide is present as CoO and $Co_3O_4$ in the ceramic composition. The average crystal grain size of the cobalt oxide is controlled to be about 20 µm or less to reduce a change in resistivity in the present invention. When the average crystal grain size is about 10 µm or less, the change in resistivity is significantly decreased.

The semiconducting ceramic element comprises the above semiconducting ceramic and electrodes formed on two main faces of the sintered ceramic. The shapes of the electrodes and the semiconducting ceramic are not limited. The semiconducting ceramic element is preferably used for suppressing a rush current, for delaying motor start, for protecting a halogen lamp or in a temperature-compensation-type quartz oscillator (TCXO). Of course, the semiconductor layer is applicable to other temperature compensation circuits and temperature detecting circuits other than these applications.

The present invention will now be described in further detail with reference to the following Examples.

EXAMPLE 1

$Co_3O_4$, $La_2O_3$ and $Cr_2O_3$ were prepared as starting materials. These materials were weighed so that the molar ratio of these materials satisfied the relationship $Co_3O_4:La_2O_3:Cr_2O_3=1.00:0.95:0.01$, and deionized water was added to these materials and mixed using metallic cobalt balls in a wet process for a predetermined time. The mixing time in the wet process was changed as shown in Table 1 to change average particle grain sizes of cobalt oxide. The mixture was dried to obtain a powdered mixture. Each powdered mixture was calcined at 1,000° C. for 2 hours to prepare calcined powder. A binder was added to the calcined powder and mixed using polyamide balls. The binder-containing powder was shaped into a disk by compression and was sintered at 1,300° C. for 2 hours in the air to form a semiconducting ceramic.

With reference to FIG. 1, a silver paste was applied to both main faces of the resulting semiconducting ceramic 1 and was baked at 900° C. for 10 hours in air to form electrodes 2. A semiconducting ceramic element 100 was thereby formed.

Table 1 shows the resistivity ρ at ordinary temperature (25° C.), the B constant, the 3CV value indicating dispersion of the resistivity ρ, and the average crystal grain size of cobalt oxides (CoO or $Co_3O_4$) present in the semiconducting ceramic. The 3CV value indicating dispersion of the resistivity ρ and the B constant was determined by three times the standard deviation of resistivity of 100 semiconducting ceramic prepared under the same conditions divided by the average resistivity thereof.

The B constant is a constant representing a change in resistance with a change in temperature, and is defined as follows:

$$B \text{ constant} = [\ln\rho(T_0) - \ln\rho(T)]/(1/T_0 - 1/T)$$

wherein $\rho(T_0)$ is resistivity at a temperature $T_0$, $\rho(T)$ is a resistivity at a temperature T, and ln indicates the natural logarithm.

The B(−10° C.) and B(140° C.) were calculated based on this equation, as follows.

$$B(-10° C.) = [\ln\rho(-10° C.) - \ln\rho(25° C.)]/(1/-10+273.15) - 1/25+273.15)$$

$$B(140° C.) = [\ln\rho(140° C.) - \ln\rho(25° C.)]/(1/140+273.15) - 1/25+273.15)$$

The average crystal grain size of cobalt oxide in the semiconducting ceramic was determined by an intercept process.

TABLE 1

| | | CoO | | | | | | |
| | Pulveriz- | $CO_3O_4$ | Resistivity | | B Constant | | | |
| | ing Time | Average | ρ (25° C.) | B (−10° C.) | | | | |
| Sam- | Before | Grain | Aver- | | Aver- | | B (140° C.) | |
| ple | Calcina- | Size | age | 3 CV | age | 3 CV | Average | 3 CV |
| No. | tion (hr) | (µm) | (Ω) | (%) | (K) | (%) | (K) | (%) |
| 1 | 1/6 | 22.3 | 16.1 | 7.6 | 4130 | 1.2 | 4510 | 1.1 |
| 2 | 1 | 21.7 | 16.0 | 8.1 | 4150 | 1.4 | 4500 | 1.2 |
| 3 | 12 | 8.3 | 16.2 | 2.6 | 4140 | 0.2 | 4510 | 0.1 |
| 4 | 24 | 7.1 | 16.1 | 2.1 | 4140 | 0.1 | 4520 | 0.1 |
| 5 | 36 | 6.9 | 16.0 | 1.9 | 4140 | 0.1 | 4520 | 0.1 |
| 6 | 60 | 6.9 | 16.2 | 2.1 | 4150 | 0.1 | 4510 | 0.1 |

As shown in Table 1, semiconducting ceramic having average crystal grain sizes of cobalt oxide of about 20 µm or less show significantly decreased 3CV values and B constants, that is, resistivities ρ of 20 Ω or less, and B constants of 4,000 K or more.

EXAMPLE 2

Semiconducting ceramic and semiconducting ceramic elements were prepared as in Example 1 except that the starting materials having the composition of Sample No. 4 in Example 1 were mixed for 24 hours by a wet process and the sintering temperature was changed as shown in Table 2 to change the average grain size of cobalt oxide crystals.

Table 2 shows the resistivity ρ at ordinary temperature (25° C.), the B constant, the 3CV value, and the average crystal grain size of cobalt oxides (CoO or $Co_3O_4$) present in the semiconducting ceramic, which were determined as in Example 1.

TABLE 2

| Sample No. | Sintering Temperature (°C.) | CoO Co₃O₄ Average Grain Size (μm) | Resistivity ρ (25° C.) Average (Ω) | | B Constant B (−10° C.) Average (K) | | B (140° C.) Average (K) | |
|---|---|---|---|---|---|---|---|---|
| | | | | 3 CV (%) | | 3 CV (%) | | 3 CV (%) |
| 11 | 1250 | 6.9 | 16.2 | 1.9 | 4140 | 0.1 | 4520 | 0.1 |
| 12 | 1300 | 7.1 | 16.1 | 2.1 | 4140 | 0.1 | 4520 | 0.1 |
| 13 | 1350 | 9.6 | 15.9 | 1.4 | 4130 | 0.1 | 4510 | 0.2 |
| 14 | 1400 | 15.7 | 15.8 | 2.6 | 4130 | 0.2 | 4520 | 0.2 |
| 15 | 1450 | 20.3 | 15.8 | 7.4 | 4130 | 0.9 | 4510 | 1.0 |
| 16 | 1500 | 24.0 | 15.6 | 9.5 | 4120 | 1.1 | 4500 | 1.2 |

As shown in Table 2, a semiconducting ceramic having average crystal grain sizes of cobalt oxide of about 20 μm or less shows significantly decreased 3CV values and B constants, that is, resistivities ρ of 20 Ω or less and B constants of 4,000 K or more.

What is claimed is:

1. A semiconducting ceramic comprising a lanthanum cobalt oxide corresponding to the formula $La_xCoO_3$ wherein $0.600 \leq x \leq 0.999$, and wherein cobalt oxide is present therein and has an average crystal grain size of not more than about 20 μm.

2. A semiconducting ceramic according to claim 1, wherein said average crystal grain size is not more than about 10 μm.

3. A semiconducting ceramic according to claim 2, further comprising at least one oxide of an element selected from the group consisting of Si, Zr, Hf, Ta, Sn, Sb, Cr, W, Mo, Te, Ce, Ni and Ca.

4. A semiconducting ceramic according to claim 3, wherein a part of La is replaced by at least one element selected from the group consisting of Ce, Pr, Nd, Pm, Sm, Eu, Gd, Tb, Dy, Ho, Er, Tm, Yb, Lu, Bi, Sr and Y.

5. A semiconducting ceramic according to claim 2, wherein a part of La is replaced by at least one element selected from the group consisting of Ce, Pr, Nd, Pm, Sm, Eu, Gd, Tb, Dy, Ho, Er, Tm, Yb, Lu, Bi, Sr and Y.

6. A semiconducting ceramic according to claim 1, further comprising at least one oxide of an element selected from the group consisting of Si, Zr, Hf, Ta, Sn, Sb, Cr, W, Mo, Te, Ce, Ni and Ca.

7. A semiconducting ceramic according to claim 6, wherein a part of La is replaced by at least one element selected from the group consisting of Ce, Pr, Nd, Pm, Sm, Eu, Gd, Tb, Dy, Ho, Er, Tm, Yb, Lu, Bi, Sr and Y.

8. A semiconducting ceramic according to claim 1, wherein a part of La is replaced by at least one element selected from the group consisting of Ce, Pr, Nd, Pm, Sm, Eu, Gd, Tb, Dy, Ho, Er, Tm, Yb, Lu, Bi, Sr and Y.

9. A semiconducting ceramic according to claim 1, wherein the cobalt oxide is at least one of CoO and $Co_3O_4$.

10. A semiconducting ceramic element comprising a semiconducting ceramic according to claim 1 and a pair of spaced apart electrodes in contact with the semiconducting ceramic.

11. A semiconducting ceramic element according to claim 10, wherein the semiconducting ceramic element comprises a part of a rush current suppressing device, a motor start delaying device, a halogen lamp protecting device, or a temperature-compensation-type quartz oscillator.

12. A semiconducting ceramic element comprising a semiconducting ceramic according to claim 6 and a pair of spaced apart electrodes in contact with the semiconducting ceramic.

13. A semiconducting ceramic element comprising a semiconducting ceramic according to claim 8 and a pair of spaced apart electrodes in contact with the semiconducting ceramic.

14. A method for producing a semiconducting ceramic, comprising:

obtaining amounts of a powdered lanthanum compound and a powdered cobalt compound such that after mixing and sintering the powdered compounds a lanthanum cobalt oxide corresponding to the formula $La_xCoO_3$ in which $0.600 \leq x \leq 0.999$ is formed;

mixing the powdered compounds in a manner such that the average grain size of cobalt oxide in a sintered compact thereof is not more than about 20 μm;

calcining the mixture;

pulverizing the calcined mixture and forming a green compact, and sintering the green compact.

15. A method for producing a semiconducting ceramic according to claim 14, wherein the lanthanum compound is lanthanum oxide.

16. A method for producing a semiconducting ceramic according to claim 14, wherein the cobalt compound is a cobalt oxide.

17. A method for producing a semiconducting ceramic according to claim 14, wherein in the mixing step, the powdered compounds are mixed with water.

18. A method for producing a semiconducting ceramic according to claim 14, wherein the mixing step is performed for 12 to 60 hours.

19. A method for producing a semiconducting ceramic according to claim 14, wherein the sintering step is performed for approximately 2 hours.

20. A method for producing a semiconducting ceramic according to claim 14, wherein the sintering step is performed at approximately 1,300° C.

21. A method for producing a semiconducting ceramic according to claim 14, wherein the mixing step is performed for approximately 24 hours and the sintering step is performed at approximately 1,250° C. to 1,400° C.

* * * * *